(12) United States Patent
Smith et al.

(10) Patent No.: US 10,425,709 B2
(45) Date of Patent: *Sep. 24, 2019

(54) SYSTEM AND METHOD FOR PROVIDING PACKETIZED VIDEO OVER AN OPTICAL NETWORK

(71) Applicant: Provenance Asset Group LLC, Essex, CT (US)

(72) Inventors: Joseph Lee Smith, Fuquay Varina, NC (US); Duane Richard Remein, Raleigh, NC (US); Amir Ghoddoussi, Benson, NC (US)

(73) Assignee: Provenance Asset Group LLC, Pittsford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/232,634

(22) Filed: Aug. 9, 2016

(65) Prior Publication Data

US 2016/0381444 A1 Dec. 29, 2016

Related U.S. Application Data

(63) Continuation of application No. 10/974,074, filed on Oct. 27, 2004, now Pat. No. 9,413,487.

(60) Provisional application No. 60/575,903, filed on Jun. 1, 2004, provisional application No. 60/575,891, filed on Jun. 1, 2004.

(51) Int. Cl.
*H04J 14/02* (2006.01)
*H04Q 11/00* (2006.01)
*H04N 21/61* (2011.01)

(52) U.S. Cl.
CPC ...... *H04Q 11/0067* (2013.01); *H04J 14/0226* (2013.01); *H04J 14/0227* (2013.01); *H04J 14/0238* (2013.01); *H04J 14/0247* (2013.01); *H04J 14/0252* (2013.01); *H04J 14/0282* (2013.01); *H04N 21/6125* (2013.01); *H04Q 2011/0016* (2013.01)

(58) Field of Classification Search
CPC .................. H04J 14/023–0234; H04J 14/0239
See application file for complete search history.

(56) References Cited

U.S. PATENT DOCUMENTS

| | | | | |
|---|---|---|---|---|
| 5,479,286 A * | 12/1995 | Stalley | ................ | H04J 14/0298 348/E7.071 |
| 6,970,461 B2 * | 11/2005 | Unitt | ..................... | H04L 12/185 348/E7.07 |
| 7,194,001 B2 * | 3/2007 | Leatherbury | ...... | H04Q 11/0478 370/395.64 |

(Continued)

OTHER PUBLICATIONS

K. Reichmann et al., "Broadcast Digital Video as a Low-Cost Overlay to Baseband Digital-Switched Services on a PON", OFC '96 Technical Digest, 1996.*

*Primary Examiner* — Shi K Li
(74) *Attorney, Agent, or Firm* — Dinsmore & Shohl LLP (57) ABSTRACT

System and method for distributing IP video are described. One embodiment is a method for distributing IP video comprising transmitting an optical data stream in a designated optical band to an optical network terminal ("ONT"), wherein the optical data stream comprises a broadcast IP video signal provided as a packetized video overlay; converting the optical data stream to an electrical data stream at the ONT; and transmitting the electrical data stream to a subscriber.

31 Claims, 6 Drawing Sheets

(56) References Cited

U.S. PATENT DOCUMENTS

| | | | | |
|---|---|---|---|---|
| 7,289,732 B2* | 10/2007 | Koh | ............... | H04B 10/272 |
| | | | | 398/66 |
| 7,333,726 B2* | 2/2008 | Kenny | ............ | H04J 14/0282 |
| | | | | 348/E7.07 |
| 2004/0133920 A1* | 7/2004 | Kim | ............... | H04N 7/17318 |
| | | | | 725/129 |

* cited by examiner

SYSTEM AND METHOD FOR PROVIDING PACKETIZED VIDEO OVER AN OPTICAL NETWORK

CROSS-REFERENCE TO RELATED APPLICATIONS

This application is a continuation of U.S. patent application Ser. No. 10/974,074 entitled SYSTEM AND METHOD FOR PROVIDING PACKETIZED VIDEO OVER AN OPTICAL NETWORK, filed Oct. 27, 2004, issued as U.S. Pat. No. 9,413,487 on Aug. 9, 2016, which claims priority to U.S. provisional patent application Ser. No. 60/575,891, filed Jun. 1, 2004 and U.S. provisional 60/575,903, filed Jun. 1, 2004, the entire contents of each are herein incorporated by reference.

1. TECHNICAL FIELD OF THE INVENTION

The present invention generally relates to distribution of video signals via distributive optical networks such as, e.g., passive optical networks ("PONs"). More particularly, and not by way of any limitation, the present invention is directed to system and method providing video overlay using packetized video over gigabit Ethernet in such optical networks.

2. DESCRIPTION OF RELATED ART

In today's access market, service providers have greater opportunities for revenue generation than ever before. Residential consumers are purchasing increasing amounts of communications and home entertainment services. Broadband communications services, such as video, form an increasingly important part of the package of services being offered by service providers to end-users. Accordingly, access network architectures are being optimized to provide cost-effective solutions for delivering a "triple play" (voice/data/video) package of services over a single, converged access network.

A passive optical network ("PON") is a system that brings optical fiber cabling and signals all or most of the way to an end-user in residential and small business networks. Depending on where the PON terminates, the system can be described as fiber-to-the-curb ("FTTC"), fiber-to-the-building ("FTTB"), fiber-to-the-cabinet ("FTTCab"), or fiber-to-the-home ("FTTH"). PONs utilize light of different colors, or wavelengths, over optical fibers to transmit large amounts of information between end-users and network/service providers. "Passive" simply means that the optical transmission has no power requirements or active electronic devices once the signal is being transported in the network. With PONS, signals are carried by lasers and sent to their appropriate destination by devices that function much like highway interchanges, without the need for any electrical power, thereby eliminating expensive powered equipment between the provider and the customer. PONS offer customers video applications, high-speed Internet access, multimedia, and other high-bandwidth capabilities, along with traditional voice (or POTS) services.

Advantages of optical technology are speed, flexibility, and lower maintenance. Because PON is independent from bit rates, signal format, and protocols, only the equipment needed for delivering the specific services needs to be added at the ends of the network when the time comes to add new services to existing customers or to add new customers. Moreover, services can be mixed or upgraded cost-effectively as required.

Three PON networking methodologies are or soon will be standardized. These include ITU broadband PON ("BPON"), ITU Giga PON ("GPON"), and IEEE Ethernet PON ("EPON"). Both of the ITU PON standards define a WDM channel for use as an optical video broadcast signal. The IEEE EPON standard does not explicitly define such a channel, but tacitly allows such a video overlay to be used. It should be understood that although xPON-type distributive networks will be described in the present patent application, such arrangements are merely exemplary rather than restrictive or limiting with respect to the embodiments of the invention set forth in detail hereinbelow.

Figure 1:
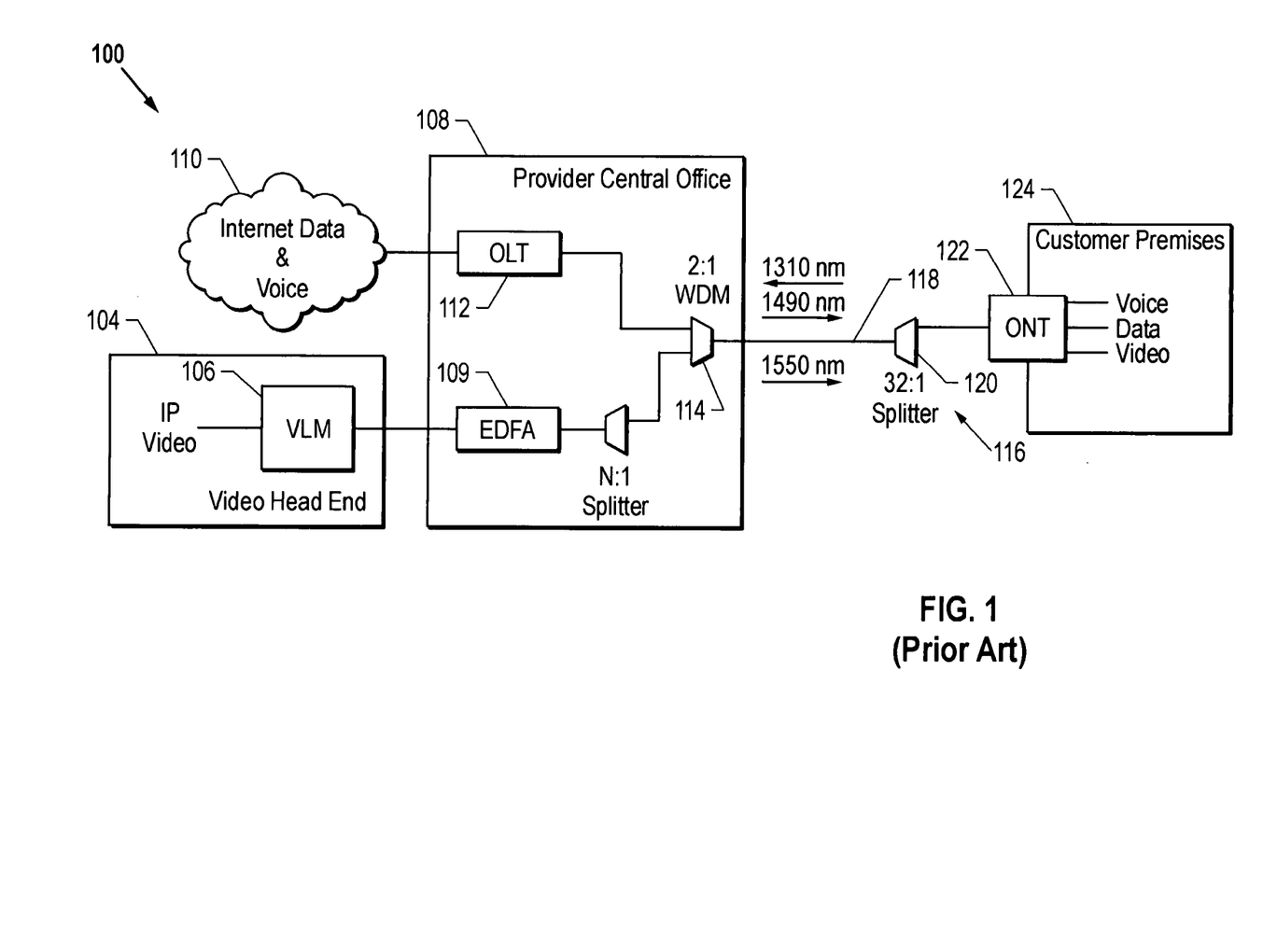
FIG. 1 (Prior Art) depicts a system block diagram of a prior art optical communications network.

FIG. 1 illustrates a block diagram of an example of a prior art communications network 100. In the network 100, one or more video laser modulators ("VLMs"), such as the VLM 106, uses the derived video signal to modulate a 1550 nm optical laser. The resultant optical signal is output from the video head end 104 to a central office ("CO") 108. A highly-linear optical amplifier ("OA") stage 109, which may be implemented using erbium-doped fiber amplifiers ("EDFAs"), at the CO 108 amplifies the optical signal to approximately +17 dBm.

Internet data and voice signals from a network 110 are converted to optical signals in the 1490 nm band by an optical line terminal ("OLT") 112. The signals output from the OLT 112 and the OA stage 109 are combined via a wavelength division multiplexer 114 and delivered to a PON 116 on a feeder fiber 118. In general, a PON provides a physical point-to-multipoint fiber connection. In one embodiment, the PON 116 is implemented using a glass splitter 120, which splits the combined signal received on the feeder fiber 118 into 32 distribution/drops for delivery to one of a plurality of optical network terminals ("ONTs"), such as the ONT 122, at a subscriber premises 124. At the ONT 122, the combined signal is terminated and delivered to the subscriber as analog voice, Internet Data (generally, either Ethernet or xDSL), and video (RF over coaxial cable). Traffic in the upstream direction (from the subscriber premises 124 to the CO 108) is carried in the 1310 nm optical band and is only directed toward the OLT 112 and does not reach the video head end 104, unless it is so directed over the data network 110.

Figure 2:
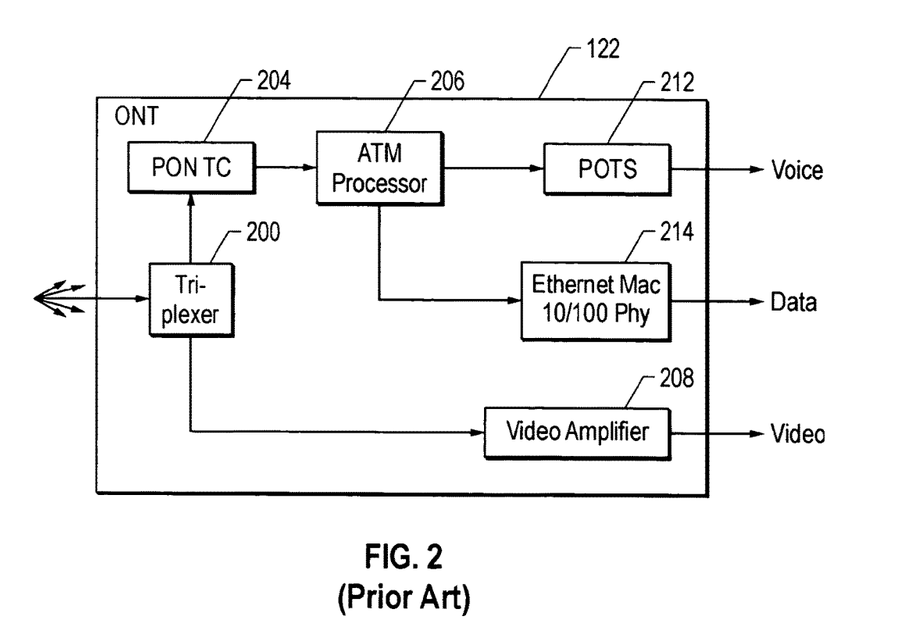
FIG. 2 (Prior Art) depicts a block diagram of an optical network terminal ("ONT") of the network of FIG. 1.

FIG. 2 illustrates a block diagram of the current architecture of the ONT 122 of FIG. 1. As shown in FIG. 2, the ONT includes a triplexer 200 that converts optical signals sent via three wavelengths into electronic signals, a broadband PON transmission convergence ("PON TC") device 204 that is equivalent to a media-access-control layer, and an ATM processor 206 that processes packetized voice into analog voice. The triplexer 200 comprises a highly-linear analog PIN photodiode for outputting RF video signals to an RF video amplifier 208. The video signals are output from the ONT 122 on a coaxial F connector. Similarly, the triplexer 200 comprises a PIN-TIA photodiode for outputting digitized data and voice signals to the PON-TC device 204. The digitized data and voice signals are then output to the ATM processor 206, which outputs the analog voice signals to POTS equipment 212 and outputs digitized data signals to an Ethernet media access control/physical access layer ("MAC/PHY") 214.

The nature of the quality parameters of the video signal at the ONT 122 requires a significant minimum optical input level (typically −6 dBm or better). This is on the order of 25 dBm higher than that of the data signal. This disparity results in challenges in signal isolation at the optical level. Additionally, the PIN photodiode in the ONT 122 is required to be highly linear, which is both difficult to fabricate and relatively expensive. Lastly, as a result of the high optical input levels required at the ONT 122, significant optical "boosting" by OAs, in the form of EDFAs, is required along the path to maintain the level of the video signal at +17 dBm. Such OAs are significantly expensive, even when their cost is extrapolated over a multi-user PON.

An in-band video distribution scheme in which packetized video data is transmitted inband with the data and voice services is promising, but has practical, real world limitations in the form of the level of processing power required by all elements in the video path (i.e., the OLT 112 and the ONT 122), which are often internally bandwidth-limited. This results in either a limitation as to the number of video channels that can be carried or selection schemes that add to the complexity.

Therefore, what is needed is a technique and architecture for delivering low-cost broadcast IP video to a large number of users.

SUMMARY OF THE INVENTION

One embodiment is a method for distributing IP video comprising transmitting an optical data stream in a designated optical band to an optical network terminal ("ONT"), wherein the optical data stream comprises a broadcast IP video signal provided as a packetized video overlay; converting the optical data stream to an electrical data stream at the ONT; and transmitting the electrical data stream to a subscriber.

Another embodiment is a system for distributing IP video comprising means for transmitting an optical data stream in a designated optical band to an optical network terminal ("ONT"), the optical data stream comprising a broadcast IP video signal provided as a packetized video overlay; means for converting the optical data stream to an electrical data stream at the ONT; and means for transmitting the electrical data stream to a subscriber.

Another embodiment is a system for distributing video, the system comprising a video head end connected to receive a broadcast IP video data stream and convert the received data stream from an electrical signal to an optical signal in a first optical band; an optical amplifier ("OA") for amplifying optical signals received from the video head end; a wave division multiplexer ("WDM") for combining the amplified broadcast IP video data stream from the OA with IP data and voice signals in a second optical band; and a distributive optical network for transmitting the combined optical signal to an optical network terminal ("ONT") at a subscriber premises, wherein at the ONT, the broadcast IP video data signals are recovered from the combined optical signal, converted back to an electrical signal, and transmitted to subscriber equipment.

Yet another embodiment is an optical network terminal comprising a triplexer for converting optical signals received on three wavelengths into electrical signals; an Ethernet physical layer ("PHY") module for receiving digital signals from the triplexer; and an Ethernet switch connected for receiving digital signals from the PHY module and passing selected video streams therethrough.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Embodiments of the invention will now be described with reference to various examples of how the invention can best be made and used. Like reference numerals are used throughout the description and several views of the drawings to indicate like or corresponding parts, wherein the various elements are not necessarily drawn to scale.

Figure 3:
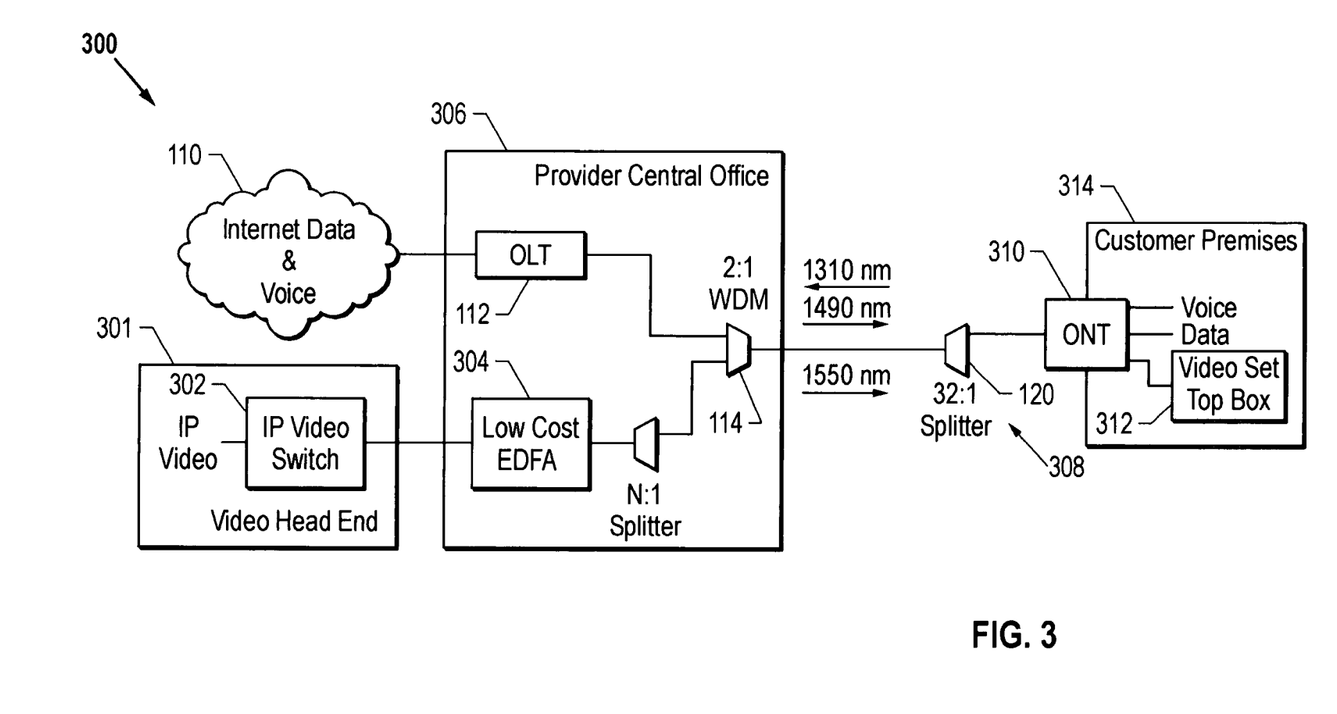
FIG. 3 depicts a system block diagram of a optical communications network of one embodiment.

Referring now to the drawings, and more particularly to FIG. 3, depicted therein is a block diagram of a communications network 300 of one embodiment. It will be recognized that the network 300 is similar to the network 100 (FIG. 1), except that the video head end 301 includes a modified IP video router, or switch, 302 rather than the VLM 106. The primary modification in the IP video switch 302 enables Ethernet packets to be broadcast (as opposed to unicast/multicast capabilities normally required by the Ethernet standard) and to drive the video channel information into the Ethernet destination address, as described below. It should be noted that a packetized video overlay using IP data could also be implemented using existing multicast protocols. The IP video switch 302 transmits the video data stream as an optical data signal compliant with a suitable Ethernet technology, such as Gigabit Ethernet, over a specific optical wavelength (e.g., 1550 nm). The output from the IP video switch 302 is distributed in much the same way as described above with respect to the network 100 (FIG. 1), with the exception that the amplification requirements are significantly less stringent.

The signal output from a low-cost OA stage 304, implemented using EDFAs, of a CO 306 toward a PON 308 does not have the same linearity requirements as an RF modulated video signal and the output level required would only need to be about 0 dBm. This concept is described in greater detail below with reference to FIG. 7.

Distribution from the CO 306 to the ONTs, such as the ONT 310, is identical to that described above with respect to the network 100 (FIG. 1). The ONT 310 is significantly different from the ONT 122, as illustrated in and described with reference to FIG. 4. Additionally, a video set top box ("STB") 312 is required to terminate the IP video stream and present it to a television (not shown) at the customer premises 314. It will be recognized that the functionality of the STB 312 may be integral to the television.

Figure 4:
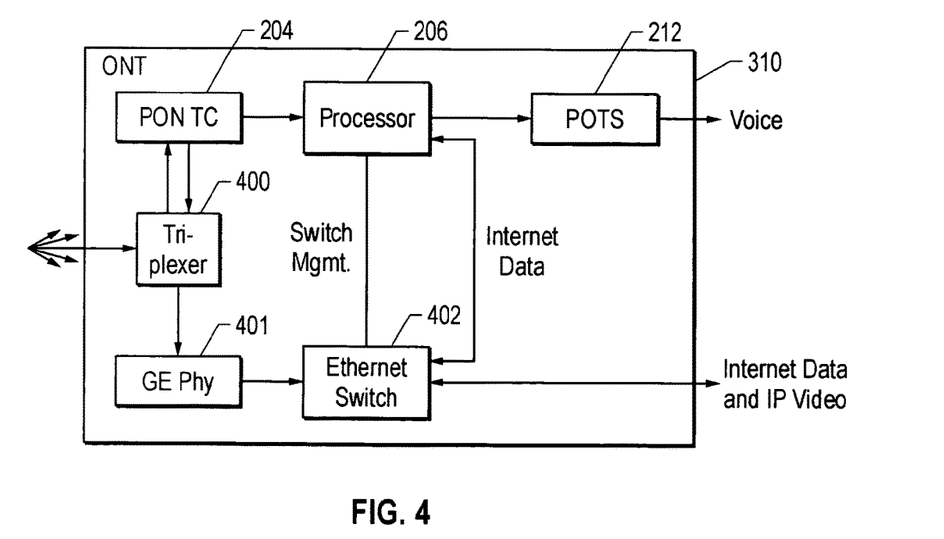
FIG. 4 depicts a block diagram of an optical network terminal ("ONT") of the network of FIG. 3.

FIG. 4 is a block diagram of the ONT 310 of FIG. 3. The triplexer 400 of the ONT 310 comprises a digital video PIN diode, the output of which is fed to an Ethernet physical access layer ("PHY") interface module 401. It will be recognized that, because both the data/POTS service and the packetized video service are digital in the embodiment described herein, one could consider using avalanche photodiodes ("APDs") for both optical detectors in the triplexer 400. This is in contrast to the highly linear analog PIN required in the triplexer 200 of the ONT 122.

From the Ethernet PHY interface 401, the signal is fed to a low-cost Ethernet switch 402 configured as a static bridge. Selected video data streams are passed through the Ethernet switch 402 in accordance with IEEE standard 802.1D. It is important to note that IP video data streams may be sent to subscribers from either the OLT data stream or from the IP video overlay. It is possible that broadcast video would be available from the overlay and interactive video would be sent from the OLT 112, although this is not a requirement. It is also important to note that channel selection is done at layer 2 and not at the IP layer, thereby significantly reducing processing requirements for the embodiment. This does not preclude solutions that would utilize existing higher layer multicast protocols; however, implementing the channel switching function in layer 2 significantly reduces processing requirements, thus lowering system costs.

With regard to channel capacity, the embodiment exemplified herein is extremely rich. For example, assuming a 4 Mbps stream per video channel (which is consistent with current MPEG encoding of standard broadcast video) approximately 250 channels could be broadcast simultaneously in the 1000 Mbps useable bandwidth capacity of a standard Gigabit Ethernet signal.

As previously indicated, certain modifications to Ethernet standards may be needed to implement the illustrated embodiment. For example, in the video head end 301, the IP video switch 302 is required to transmit an IP video data stream in a "promiscuous mode"; that is, it blindly transmits all serviced IP video data streams without acknowledgment from the terminating end. The IP video switch 302 is operable to perform in a half-duplex mode. Current IP standards require an ACK for each packet sent; this requirement may be relaxed from the protocol as there is no signal destination.

Figure 5:
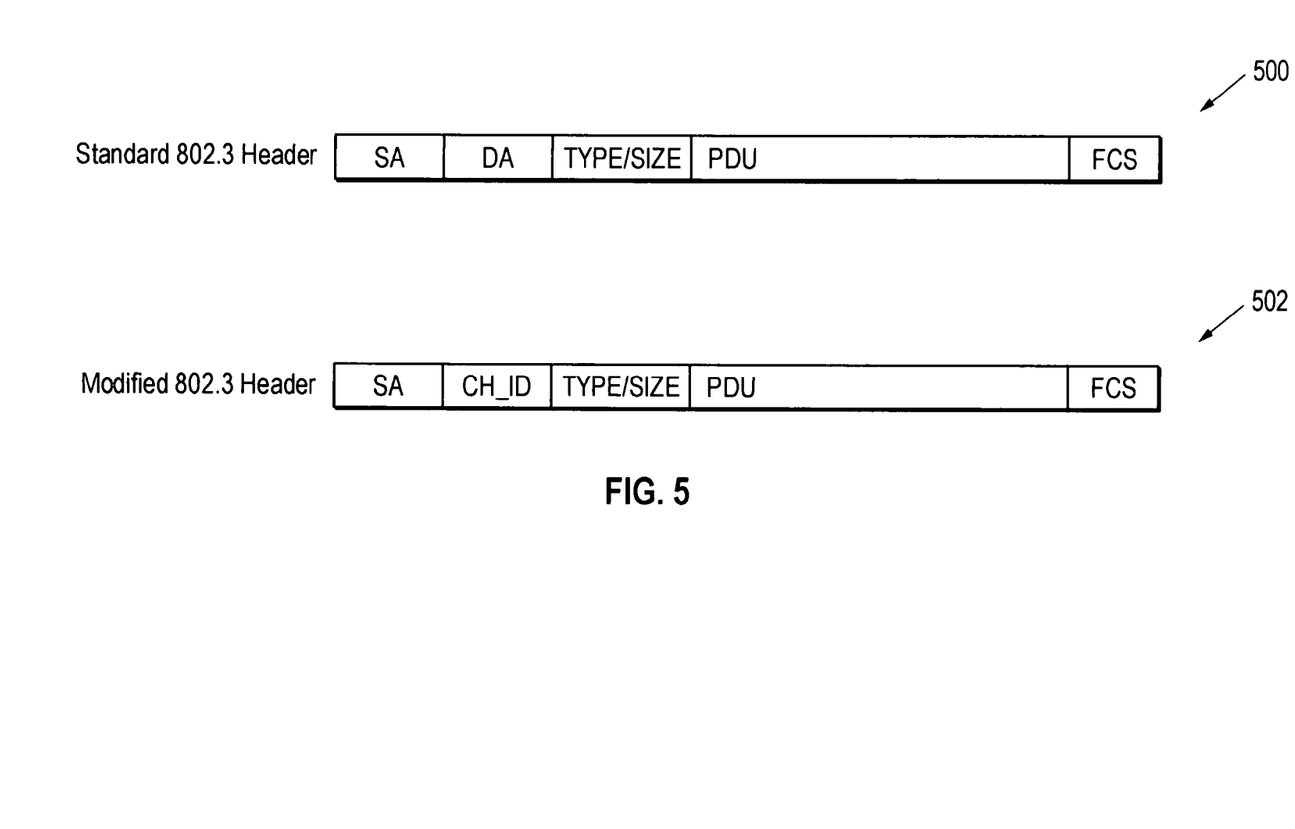
FIG. 5 depicts an Ethernet header wherein the destination address ("DA") is replaced with a video channel ID ("CH_ID") in accordance with one embodiment.

Additionally, the Ethernet header transmitted out the IP video distribution port is modified by replacing the normally transmitted Ethernet MAC destination address ("DA") with a video channel ID ("CH_ID"). In one embodiment, the CH_ID may be similar to the Ethernet DA in terms of length and position, but could be considered "private" and would not have to conform to standard regulation public MAC addresses, although this may be advisable. This DA substitution is illustrated in FIG. 5, in which a standard 802.3 header is designated by a reference numeral 500 and a modified 802.3 header is designated by a reference numeral 502. It should be noted that the channel identification information is contained in the IP video stream. Generally, this is within the layer 4 MPEG encoding protocol.

Moreover, a modification to the standard Ethernet MAC is required to pass all Ethernet streams received, regardless of destination address, to the Ethernet switch 402. In the switch 402, the selected video stream(s) are passed to the output port with the DA of the intended video STB 312 substituted for the CH_ID. The ONT 310 is operable to participate in a channel selection protocol to configure the statically-mapped Ethernet switch 402 pass the selected channels.

Finally, a suitable protocol, proprietary or industry-standard, can be used between the video STB 312 and the ONT 310 for channel selection. It will be recognized that several such protocols already exist that could perform this task. In the event that both broadcast and interactive video services are being delivered, the ONT 310 may be required to forward interactive video signaling and messages to the OLT 112 for further processing upstream. It would also be possible in this embodiment for the ONT 310 to send billing information to the video provider.

Figure 6:
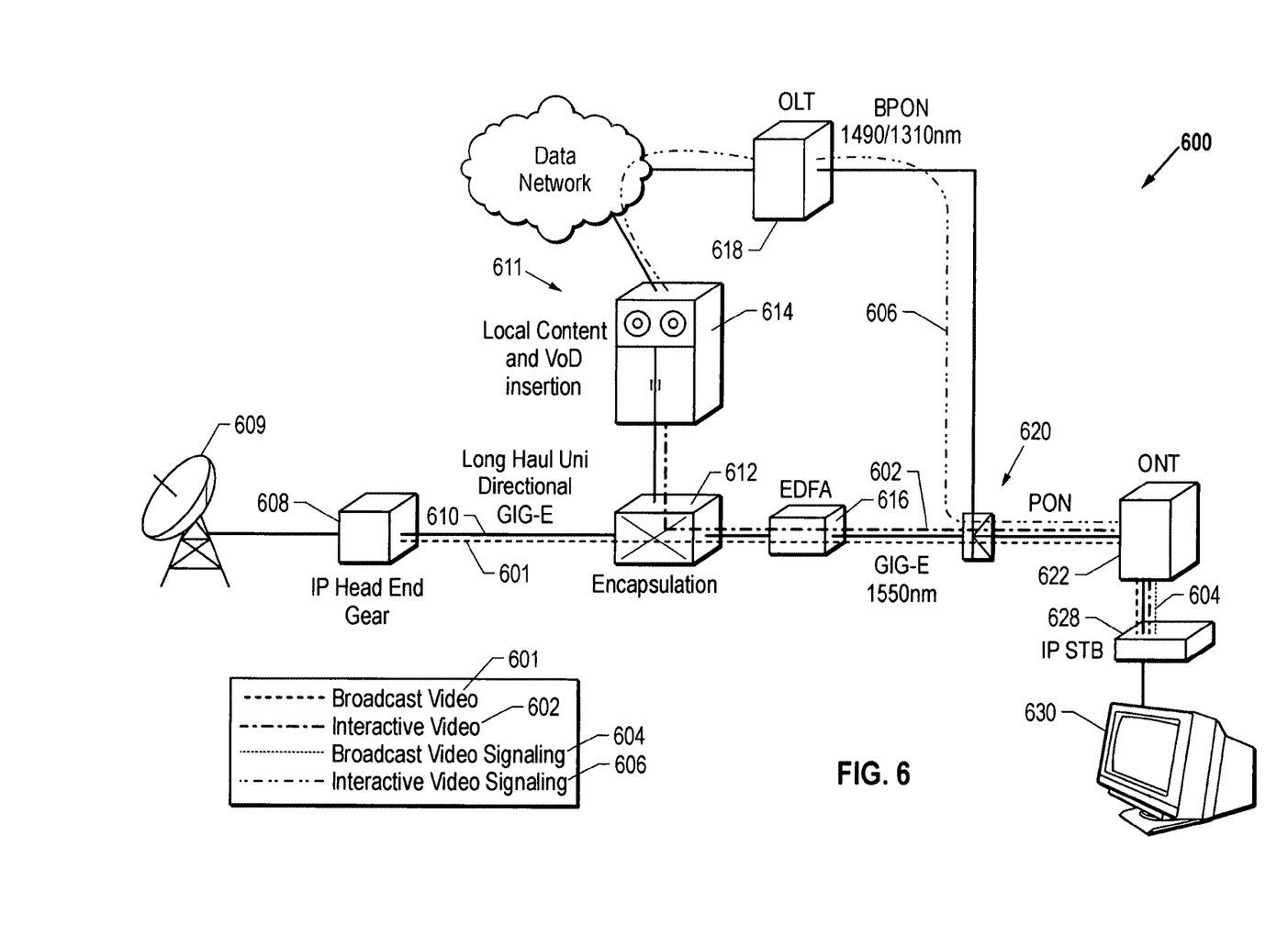
FIG. 6 depicts signal flow in a network implementing a digital video overlay architecture in accordance with one embodiment.

FIG. 6 illustrates signal flow in a network 600 implementing the digital video overlay architecture in accordance with one embodiment. In particular, downstream traffic (i.e., traffic directed toward the subscriber) of interest consists of two data streams, including broadcast IP video, designated by a reference numeral 601, and interactive IP video, designated by a reference numeral 602. Similarly, upstream traffic (i.e., traffic directed away from the subscriber) of interest consists of two signaling streams, including broadcast IP video signaling, designated by a reference numeral 604, and interactive IP video signaling, designated by a reference numeral 606.

The network 600 also handles voice and High Speed Internet ("HSI") traffic; accordingly, voice and HSI traffic flow are also briefly described herein for purposes of clarity but are not necessary for practicing the teachings set forth herein.

The broadcast IP video data stream 601 is generally sourced from a centrally located video head end 608. Video program material is received from a satellite 609 or other long haul distribution sources and prepared for transmission over the local distribution network 600 at the video head end 608. The broadcast IP video data stream 601 is transmitted as a simplex (i.e., unidirectional) signal over a standard data transmission medium, such as a Gigabit Ethernet 610, to a local office 611 where the data stream 601 is received by a switching device 612.

The interactive IP video data stream 602, as well as locally-derived content 614, are generated at the local office 611 and are also sent to the switching device 612. The switching device 612 combines the two IP video data streams 601, 602, and transmits them towards the subscriber as optical data signals, such as Gigabit Ethernet, over a specific optical wavelength (e.g., 1550 nm). Depending on the split ratio for the IP video data streams 601, 602, the optical data signals may or may not be further amplified by an Erbium Doped Fiber Amplifier (EDFA) 616.

The voice data stream (e.g., as AAL2-encapsulated ATM) is combined with the HSI data stream in an OLT 618. The resultant data stream is transmitted using a second optical wavelength (e.g., 1490 nm). The two combined optical signals (i.e., the 1550 nm signal and the 1490 nm signal) are further combined by a WDM (FIG. 4) for distribution over a PON 620, which may split the combined signal to serve a number of subscribers, e.g., up to 32 subscribers.

An ONT 622, which has been illustrated in and described in greater detail above with reference to FIG. 4, terminates the PON 620 at the subscriber end. As illustrated in FIG. 4, the triplexer 400 of the ONT 622 separates and recovers the 1550 nm and 1490 nm optical data streams. The 1550 nm carrying the IP Video data is sent to the GE PHY 401. The 1490 nm data stream is sent to the PON TC device 204. The PON TC device 204 extracts the ATM cells destined for this subscriber and discards all other cells. The resultant filtered ATM data stream is forwarded to the ONT processor 206, in which the data streams are de-encapsulated into either raw digital voice (e.g., DS0 signals) or Ethernet (HSI). Voice signals are then converted into the analog domain and sent to the subscriber on POTS lines 212.

The HSI and recovered IP Video are sent to the Ethernet switching device 402, in which selected IP Video streams are combined with the HSI data and transmitted to the subscriber over an Ethernet links such as a single 10/100BaseT metallic link. Referring again to FIG. 6, a subscribers' STB 628 terminates or routes the IP Video content embedded in the 10/100BaseT signal and, if necessary, translates it as necessary for transmission to a standard television set The HSI data is sent to the subscriber's personal computer 630 via a hub or home router (not shown).

With regard to upstream signaling, voice data signals are sent to the ONT 622 over standard POTS lines. The ONT 622 converts the voice signals to the digital domain and encapsulates them into AAL2 ATM. These ATM cells are forwarded to the PON TC 204 (FIG. 4) for transmission over the PON 620 in the 1310 nm optical band.

Subscriber HSI data is sent to the ONT 622 over an 10/100BaseT port and the home network may likely contain a router device (not shown) to combine the various 10/100BaseT streams generated in the home. Video signaling for both broadcast and interactive video is generated by the subscriber using buttons or switches at the STB 628. These signals are encapsulated via an appropriate protocol, such as Internet Group Management Protocol or IGMP, and transmitted by the STB 628 over a 10/100BaseT link towards the network. Upon receiving the video signaling data at ONT 622 a 10/100BaseT interface, the signaling is forwarded to the integrated Ethernet Switch 402 thereof (FIG. 4).

Referring now to FIG. 4, the Ethernet switch 402 forwards all received upstream data streams to the ONT processor 206. The ONT processor 206 performs AAL5 encapsulation on all data streams received from the switch 402 and forwards them to the PON TC 204 for transmission over the PON 620. It should be noted that the video signaling data stream must be identified by the ONT processor 206 and may be sent upstream over a different ATM channel than that used for HSI data. The ONT processor 206 is also required to "snoop" the video signaling data protocol.

When a join or leave message for a given video channel stream is noted by the ONT processor 206 in the video signal data protocol the ONT processor is capable of configuring the Ethernet switch 402 to pass or block the referenced IP Video stream as appropriate.

An optical combiner (not shown) on the network side of the PON 620 separates and isolates the various optical wavelengths. In the upstream direction, the combiner directs the 1310 nm wavelength towards the P-OLT 618 and blocks the 1550 nm wavelength. Thus the P-OLT 618 receives only one optical signal; that is, the 1310 nm wavelength signal sourced by the ONTs, such as the ONT 622, on the PON 620.

The voice and HSI data cells received from the ONTs, such as the ONT 622, at the P-OLT 618 are routed to the appropriate ATM port(s) in the P-OLT 618 and then transmitted into the provider's network (not shown).

The video signaling data streams from the ONTs, such as the ONT 622, are also forwarded to the provider data network. Standard routing protocols in the provider data network will route the video signaling data streams to the interactive video server 614 in the local office 611. The video server 614 ensures that the proper interactive IP video channel data streams are forwarded to the Ethernet Switch that is handling the IP video switching tasks. In some cases, the video switching information may also be forwarded to the Ethernet switch to ensure that the proper interactive IP video channel data streams are sent to the appropriate downstream Ethernet port towards the subscriber.

Figure 7:
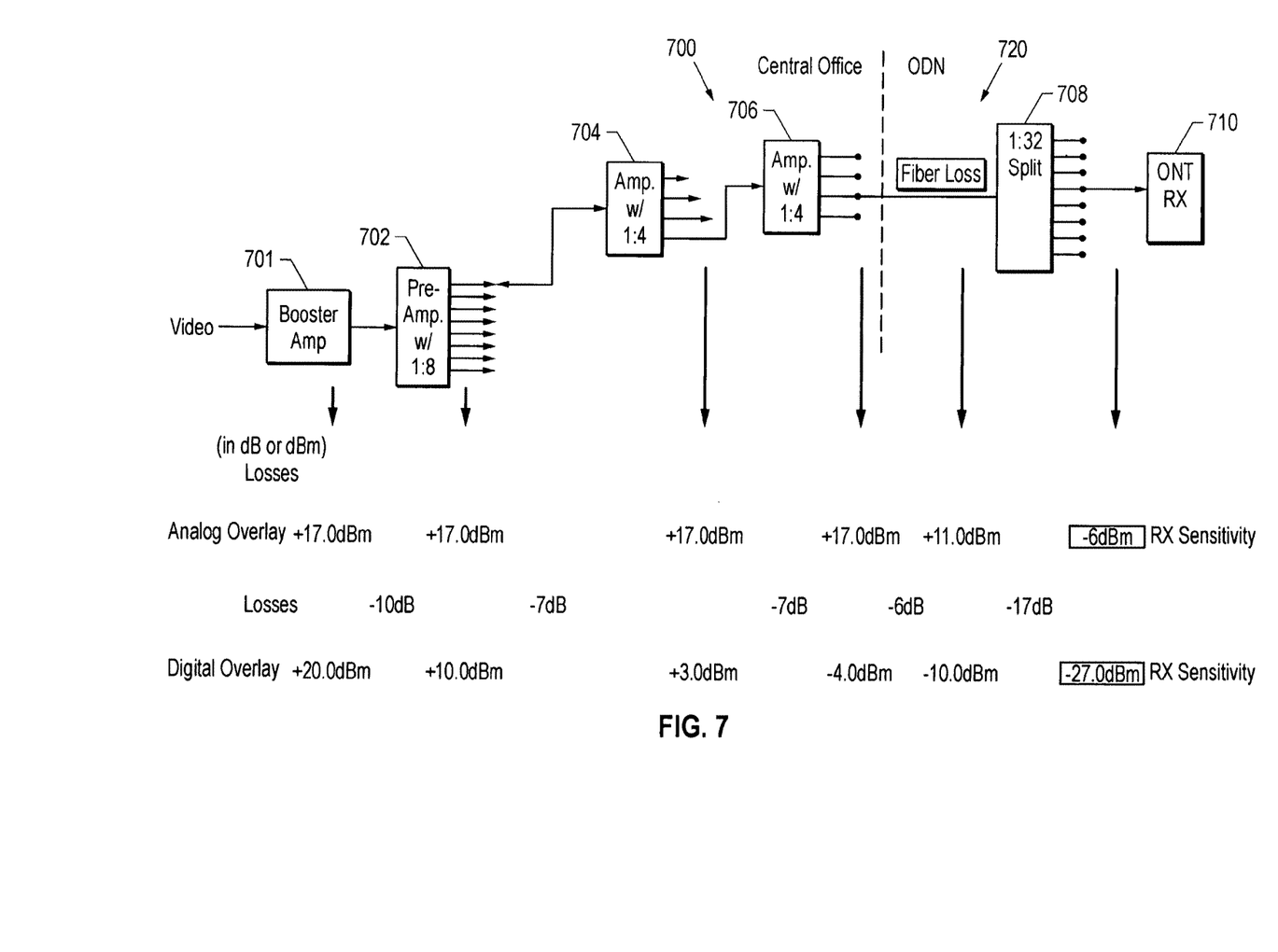
FIG. 7 depicts a comparison between a prior art video distribution system and a video distribution system using a digital overlay technique of one embodiment.

FIG. 7 illustrates a comparison between a representative prior art video distribution system and a video distribution system using a digital video overlay technique of one embodiment. As illustrated in FIG. 7, in a prior art system, a video data signal is input to a CO 700 via a booster amplifier ("booster amp") 701, which boosts the level of the video data signal to +17 dBm. A preamplifier ("preamp") 702 compensates for a 10 dB splitter loss and amplifies the video data signal to +17 dBm, in addition to performing a 1:8 split of the signal. A first OA 704 compensates for a second splitter loss, this one being 7 dB, and reamplifies the signal to +17 dBm, in addition to performing a 1:4 split of the signal. A second OA stage 706 compensates for an additional 7 dB splitter loss and again returns the video data signal to a +17 dBm level, in addition to performing a second 1:4 split of the signal. The signal loses an additional 23 dB (which includes a 6 dB fiber loss between the OA 706 and a splitter 708 and a 17 dB splitter loss due to the splitter 708). The ONT 710 receive sensitivity is therefore approximately −6.0 dBm.

In contrast, in accordance with one embodiment of a digital video overlay system, the booster amp 701 boosts the level of the video data signal to +20 dBm. The remaining amplifiers 702, 704, and 706, do not operate to amplify the signal; rather, they perform only splitting functions with the same associated splitting losses. As a result the level of the signal that arrives at the ONT 710 is −27.0 dBm.

In summary, using the digital video overlay technique described herein, all of the amplifiers, except for the booster amp 700, can be removed. The split levels can be maintained, but they simply no longer require OAs to maintain the high output levels. Additionally, an optical distribution network ("ODN") 720, which consists of fiber and splitter losses, is assumed to be the same regardless of the approach used. In a nominal digital video overlay, a +20 dBm output booster amp 700 in the CO 701 results in an ONT receive ("ONT RX") level of about −27 dBm. For a Gigabit-type data carrier for the video signal, this is in the range of reasonable performance. This level is also in the same range as the data receive level, thereby reducing the requirements for optical cross-talk and isolation.

Moreover, there is a large reduction of a significant portion of active electronics in the embodiment described herein in the form of a reduced number of OAs. This reduces not only deployment costs, but also maintenance costs, resulting in significantly lowered prove-in costs for fiber triple-play deployments.

Additionally, a digital video overlay that utilizes packetized video on a standard protocol, such as Gigabit Ethernet, as described herein, results in additional advantages. First, as the data ranges at the ONT are similar, the optical receive sensitivities are practically the same, significantly reducing optical cross-talk issues, compared to the RF video overlay scheme. As the video is being carried as a digital stream, there is no longer a need for a highly linear video analog PIN in the ONT. In fact, since both the data/POTS service and the packetized video service are digital, one could consider using avalanche photodiodes for both optical detectors in the ONT, increasing effective sensitivities by a few dBm. These APDs could provide either a significant increase in optical reach, or a relaxation of optical transmission power, or an increase in the split ratio, further reducing shared network equipment costs.

Another advantage is that the head end CO would need significantly less optical amplification, since effectively a 21 dB reduction in video optical power level required at the ONT will be realized. As previously noted, for most applications, only the booster amp will be required. All of the same optical splits can be accommodated without the need for intermediate optical amplification. This could save a significant percentage of the cost to provide video to the subscriber in triple-play scenarios, making the xPON technology even more attractive for such applications.

Finally, since the embodiments describe herein use the digital video overlay scheme, none of the video traffic necessarily goes through the OLT. This provides for the maximum downstream throughput for data intensive applications, video conferencing, and so forth, without the trade-offs that would be needed to handle the significant bandwidth needs of packet video in the local DSPs of the OLT serving hundreds or thousands of subscribers. By using the digital video overlay scheme described herein, the local ONT is able to optimize the service offerings for a particular subscriber.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A method for distributing IP video comprising:
prior to transmitting an optical data stream is a designated optical band, receiving a broadcast IP video signal, combining the broadcast IP video signal with an additional IP video signal, and converting the combined IP video signal to an optical data stream in a designated optical band by a modified IP video switch, the modified IP video switch adapted to transmit the video data stream as an optical data signal and drive video channel information into an Ethernet destination address;
amplifying the optical data stream;
transmitting, by the modified IP video switch, the optical data stream in the designated optical band to an optical network terminal ("ONT"), wherein the optical data stream comprises the broadcast IP video signal provided as a packetized video overlay;
converting the optical data stream to an electrical data stream at the ONT; and
transmitting the electrical data stream to a subscriber.

2. The method of claim 1 wherein transmitting the optical data stream is performed in a promiscuous mode.

3. The method of claim 1 wherein the modified IP video switch is located in a video head end apparatus.

4. The method of claim 1 wherein each packet of the broadcast IP video signal comprises a header, the method further comprising, for each header, replacing an Ethernet MAC destination address ("DA") with a video channel identification ("CH_ID").

5. The method of claim 4, wherein channel switching is implemented at layer 2 of multicast protocols.

6. The method of claim 1 wherein the transmission of an optical data stream in a designated optical band is performed over a passive optical network ("PON").

7. The method of claim 1, wherein the additional IP video signal is an interactive video signal.

8. The method of claim 1, wherein the additional IP video signal is a locally-generated video signal.

9. The method of claim 1 wherein the transmitting the optical data stream to an ONT further comprises splitting the optical data stream into a plurality of optical data streams each for delivery to an ONT.

10. The method of claim 1 further comprising:
receiving Internet voice and data at an optical line terminal ("OLT");
converting the received Internet voice and data to an additional optical data stream portion in a different optical band; and
combining the additional optical data stream portion into the optical data stream prior to the transmitting the optical data stream to an optical network terminal ("ONT").

11. The method of claim 10 further comprising, prior to transmitting the electrical data stream to a subscriber:
separating and recovering the additional optical data stream portion from the optical data stream;
converting the additional optical data stream portion back to an electrical signal comprising the IP voice and data signals;
converting the IP voice signals into analog voice signals and providing the analog voice signals to a POTS device; and
providing the IP data signals to a data device.

12. The method of claim 10, wherein the additional IP video signal is sent as IP video overlay.

13. The method of claim 1, wherein the designated optical band has an optical wavelength of about 1550 nm.

14. A system for distributing IP video comprising:
means for transmitting an optical data stream in a designated optical band to an optical network terminal ("ONT") by a modified IP video switch, the optical data stream comprising a broadcast IP video signal provided as a packetized video overlay, the modified IP video switch adapted to transmit the video data stream as an optical data signal and drive video channel information into an Ethernet destination address;
means for converting the optical data stream to an electrical data stream at the ONT;
means for receiving the broadcast IP video signal;
means for combining the broadcast IP video signal with an additional IP video signal into a combined IP video signal;
means for converting the combined IP video signal to the optical data stream in the designated optical band;
means for amplifying the optical data stream prior to transmission thereof to the ONT; and
means for transmitting the electrical data stream to a subscriber.

15. The system of claim 14 wherein the modified IP video switch transmits the optical data stream in a promiscuous mode.

16. The system of claim 15 wherein the modified IP video switch is located in a video head end apparatus.

17. The system of claim 14 wherein the means for transmitting the electrical data stream to a subscriber comprises a passive optical network ("PON").

18. The system of claim 14 wherein the additional IP video signal is an interactive video signal.

19. The system of claim 14 wherein the means for transmitting the optical data stream to an ONT further comprises means for splitting the optical data stream into a plurality of optical data streams each for delivery to an ONT.

20. The system of claim 14 further comprising:
means for receiving Internet voice and data at an at optical line terminal ("OLT");
means for converting the received Internet voice and data to an additional optical data stream portion in a different optical band; and
means for combining the additional optical data portion into the optical data stream prior to the transmitting the optical data stream to an optical network terminal ("ONT").

21. The system of claim 20 further comprising:
  means for separating and recovering the additional optical data stream portion from the optical data stream;
  means for converting the additional optical data stream portion back to an electrical signal comprising the IP voice and data signals;
  means for converting the IP voice signals into analog voice signals and providing the analog voice signals to a POTS device; and
  means for providing the IP data signals to a data device.

22. A system for distributing video, the system comprising:
  a video head end connected to receive a broadcast IP video data stream and convert the received data stream from an electrical signal to an optical signal in a first optical band, the video head end comprising an IP video switch for transmitting an IP video data stream in a promiscuous mode, the IP video switch adapted to transmit the video data stream as an optical data signal and drive video channel information into an Ethernet destination address;
  an optical amplifier ("OA") for amplifying optical signals received from the video head end;
  a wave division multiplexer ("WDM") for combining the amplified broadcast IP video data stream from the OA with IP data and voice signals in a second optical band; and
  a distributive optical network for transmitting the combined optical signal to an optical network terminal ("ONT") at a subscriber premises, wherein at the ONT, the broadcast IP video data signals are recovered from the combined optical signal, converted back to an electrical signal, and transmitted to subscriber equipment comprising a set top box ("STB").

23. The system of claim 22 wherein the OA is an erbium doped fiber amplifier ("EDFA").

24. The system of claim 22 wherein the ONT is located at a subscriber premises.

25. The system of claim 22 further comprising an optical line terminal ("OLT") for converting the IP data and voice signals from electrical signals to optical signals in a 1490 nm optical band.

26. The system of claim 22 wherein the distributive optical network is implemented as a PON using a splitter operable to split the combined optical signal into a plurality of optical sign al streams.

27. The system of claim 22 wherein the ONT comprises a triplexer for converting the optical signals into electrical signals.

28. The system of claim 27 wherein the ONT comprises an Ethernet switch configured as a static bridge connected to receive the IP video data stream from the triplexer.

29. The system of claim 22, wherein the optical network terminal comprises:
  a triplexer for converting optical signals received on three wavelengths into electrical signals, the triplexer comprising an avalanche photodiode ("APD") for detecting an optical signal comprising an IP video data stream;
  an Ethernet physical layer ("PHY") module for receiving digital signals from the triplexer; and
  an Ethernet switch connected for receiving digital signals from the PHY module and passing selected video streams therethrough.

30. The ONT of claim 29 wherein the Ethernet switch is configured as a static bridge.

31. The ONT of claim 29 wherein video streams are passed through the Ethernet switch per an IEEE standard.

* * * * *